US008432356B2

(12) United States Patent
Chase (10) Patent No.: US 8,432,356 B2
(45) Date of Patent: Apr. 30, 2013

(54) BUTTON WITH EDGE MOUNTED PIVOT POINT

(75) Inventor: Steven Chase, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 1003 days.

(21) Appl. No.: 12/351,717

(22) Filed: Jan. 9, 2009

(65) Prior Publication Data

US 2010/0177033 A1    Jul. 15, 2010

(51) Int. Cl.
*G09G 5/00*      (2006.01)

(52) U.S. Cl.
USPC ........... 345/156; 345/161; 345/164; 345/167; 345/169

(58) Field of Classification Search .......... None
See application file for complete search history.

(56) References Cited

U.S. PATENT DOCUMENTS

| 5,534,888 | A * | 7/1996 | Lebby et al. ................ | 345/672 |
| 5,847,698 | A | 12/1998 | Reavey et al. | |
| 6,344,618 | B1 * | 2/2002 | Sato .............................. | 200/6 A |
| 6,441,753 | B1 * | 8/2002 | Montgomery ............... | 341/34 |
| 6,677,843 | B1 | 1/2004 | Monroe et al. | |
| 7,499,025 | B2 * | 3/2009 | Endo et al. ................... | 345/157 |
| 7,705,799 | B2 * | 4/2010 | Niwa .............................. | 345/1.1 |
| 7,748,634 | B1 * | 7/2010 | Zehr et al. .................... | 235/492 |
| 7,772,507 | B2 * | 8/2010 | Orr et al. ...................... | 200/5 R |
| 8,018,431 | B1 * | 9/2011 | Zehr et al. .................... | 345/156 |
| 2005/0099391 | A1 * | 5/2005 | Nishino et al. .............. | 345/161 |
| 2005/0264540 | A1 * | 12/2005 | Niwa ............................. | 345/173 |
| 2006/0250377 | A1 * | 11/2006 | Zadesky et al. ............. | 345/173 |
| 2009/0058802 | A1 * | 3/2009 | Orsley ......................... | 345/157 |
| 2009/0102785 | A1 * | 4/2009 | Sun et al. ..................... | 345/156 |

FOREIGN PATENT DOCUMENTS

CN      1365240      8/2002

OTHER PUBLICATIONS

PCT Search Report for PCT Application No. PCT/US10/20367, mailed May 26, 2010, 10 pages.
Chinese Office Action mailed Jan. 14, 2013 for Chinese patent application No. 201080004325.7, a counterpart foreign application of U.S. Appl. No. 201080004325.7, 20 pages.

* cited by examiner

*Primary Examiner* — Dismery Mercedes
(74) *Attorney, Agent, or Firm* — Lee & Hayes, PLLC (57) ABSTRACT

A device disclosed herein reduces inadvertent activation of buttons mounted on edges of an electronic device. The button moves around an axis of rotation proximate to, and parallel with, the adjacent edge of the device. Thus, inadvertent pressure on an edge of the button adjacent to the edge of the device will not inadvertently activate the button. Additionally, the presence of the axis of rotation proximate to the edge maintains a desired reveal.

20 Claims, 3 Drawing Sheets

BUTTON WITH EDGE MOUNTED PIVOT POINT

BACKGROUND

Electronic devices such as electronic book readers ("e-book readers"), cellular telephones, portable media players, desktop computers, laptops, tablet computers, netbooks, and the like, may utilize human input devices. Human input devices (HIDs) may include, for example, switches or buttons activated by pressure from a human user.

Various factors determine the location of a button on an electronic device. These factors include form factor of the device, percentage of front surface area allocated to a display, look and feel, or functions of the devices. Assignment of a frequently used function to a particular button, located in a position most convenient to the user, enhances the user experience. For example, an electronic device may use buttons disposed around a perimeter of the device's case to accept user input. These actions may include turning pages on an e-book device, advancing to the next song on an audio device, or navigating a web page.

Existing buttons disposed on an edge along the perimeter of a device have had a hinge located near an inboard edge of the buttons (i.e., an edge located laterally inward of an edge of the device). However, buttons with such inboard hinges are prone to accidental activation. Inadvertent or unintended pressure during handling of the device may result in registration of an unwanted input.

Additionally, buttons disposed on the edge of an electronic device and having inboard hinges may not have a smooth reveal. The reveal is the line or visible edge resulting from a joint between two components. Traditionally, achieving a smooth reveal for buttons disposed on the edge of an electronic device has been challenging given the underlying mechanism of the button. Where the reveal is not smooth, damage to buttons may occur. For example, a projecting button may snag when a user inserts or removes an electronic device from a cover. The snag may inadvertently activate the button and/or damage the button.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As described above, a button may be located along an edge of an electronic device such as an e-book reader, tablet computer, etc., to ease user input and facilitate the user experience. In some implementations, providing hinged page turning buttons along an exterior of the device may enhance a user experience by replicating the actions of reading and turning pages of a physical book. To reduce inadvertent activation of such edge mounted buttons and provide a smoother reveal, the edge mounted buttons may be configured to pivot about an outboard edge of the button. That is, the buttons may be configured to pivot about an axis parallel to the edge of the device and between the midpoint of the button surface and the edge of the device. Thus, inadvertent pressure applied at an outer edge of the button proximate to the edge of the device does not result in activation of the button. Furthermore, proximity of the pivot to the outer edge increases the mechanical strength of the button and allows improved control over the reveal.

In one illustrative example, an e-book reader may have user input buttons which, when activated, change the page displayed. When activated, a button located on the right edge of the e-book reader's case may be configured to turn a displayed book to the next page. Similarly, when activated, a button located on the left edge of the e-book reader's case may be configured to turn a displayed book to the previous page.

E-book readers are used laying flat on a surface, such as a desk, but may also be held in the hand of the user, as with a conventional book. In such cases, a user may inadvertently activate a button by brushing a thumb or finger against the button while reading or when picking up the e-book reader. By configuring these page turning buttons with an outboard hinge, the likelihood of inadvertent activation is greatly reduced.

To reduce accidental activation, the button is disposed about an axis of rotation which parallels the edge of the device and is proximate to an edge of the device. A shaft or a hinge may maintain the axis of rotation. Alternately, the button may incorporate an integral living hinge comprising a thin flexible plastic or metal. In still other embodiments, the button may comprise a membrane or resilient material to act as both a spring and a hinge. For example, a first resilient member may connect the button to the device on the outermost edge of the button and a second resilient member may connect the button to the device on the innermost edge of the button. The first resilient member may have a greater modulus of elasticity and thus yield less to pressure than the second resilient member, thus resulting in a pivot motion when pressure is applied to the button.

A spring, the natural flexure of a living hinge, or a separate resilient material, maintains an unactivated configuration of the button. Upon application of a pressure on the button's surface distal to the axis of rotation and distal to the edge of the device, the button moves in an arc about the axis of rotation and may activate a switch. Activation of the switch provides the signal to the e-book reader indicating a page turn. Conversely, application of pressure on the button's surface distal to the axis of rotation and proximate to the edge of the device will not result in activation.

The distance between the edge of the device and the axis of rotation may vary to affect the responsiveness of the button. Where the axis of rotation is located immediately adjacent to the edge of the device or incorporated within, as in the case of a living hinge, application of pressure on the button's surface at a point distal to the axis of rotation activates the button. Where the axis of rotation is more distant from the edge of the device, pressure on the portion of the button in the relatively smaller area between the innermost edge of the button and the axis of rotation is necessary to activate the switch.

Placement of the axis of rotation for the button proximate to and parallel with the edge of the device thus prevents inadvertent application of pressure at the edge of the device from inadvertently indicating a page turn.

While buttons are described in the context of an illustrative e-book reader device, other devices including netbooks, laptops, tablet computers, media players, etc., may also employ edge mounted buttons with outboard pivots according to this disclosure.

Exterior Pivot

Figure 1:
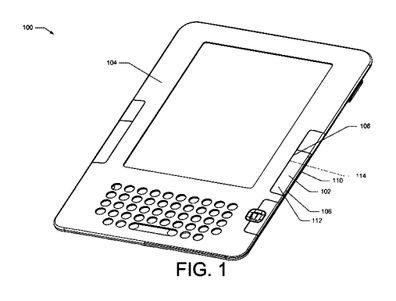
FIG. 1 is an illustrative e-book reader with page turning buttons disposed along an edge.

FIG. 1 is an illustration of an e-book reader 100 with buttons 102 disposed about the edge of the device on a front surface 104. An illustrative axis of rotation 106 is positioned adjacent to, and parallel with, the perimeter, for button 102. To activate the button 102, a user would thus exert a pressure towards the e-book reader 100 at an inner portion of the button 102 (i.e., between an innermost edge 108 of the button located distal to the edge of the device 110 and the axis of rotation 106), for example at point 112. A cross section of button 102 along line 114 is shown next in FIG. 2.

Figure 2:
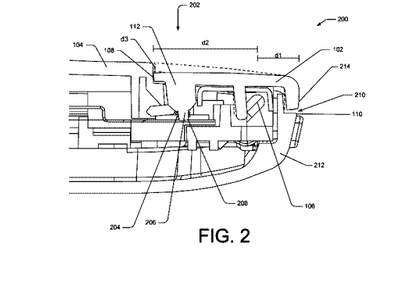
FIG. 2 illustrates a cross section of a button of the e-book reader of FIG. 1, in an activated configuration.

FIG. 2 illustrates a cross section 200 through the line 114 of the button 102 disposed on a rightmost edge 110 of the e-book reader 100. In FIG. 2, the button 102 is shown in a depressed or activated configuration. Button 102 is shown with the axis of rotation 106 proximate to the edge 110 of the device 100. Distance "d1" indicates the distance from the center of the axis of rotation 106 and the edge of the device 110. In various implementations, the distance d1 may be about zero to about 3 millimeters. Distance "d2" indicates the distance from the axis of rotation 106 and the innermost edge 108 of button 102. In some implementations, distance d2 may be about 2 to about 8 millimeters. Also in some implementations, the axis of rotation 106 may be placed from about zero to about nine-tenths the distance from the edge of the device 110 to the innermost edge 108 of the button 102. In one embodiment, the axis of rotation is located about four-tenths the distance from the edge of the device 110 to the innermost edge 108 of the button 102.

A user exerts pressure generally in the direction of arrow 202 at the point 112 distal to the axis of rotation 106. This pressure compresses a spring 204, and allows a protrusion 206 to come in contact with a switch 208, thus sending a signal indicating activation. The arc of rotation "d3" of the button 102 during activation defines a gap 210 between the edge of button 102 and a bottom cover 212. The arc of rotation d3 may describe an angle of rotation greater than 0 degrees and less than 90 degrees. The outside vertical edge 214 of button 102 may also be configured to come into contact with bottom cover 212, thus acting as a hinge.

Figure 3:
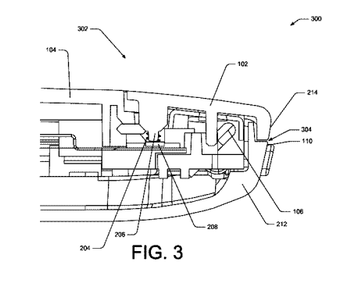
FIG. 3 illustrates a cross section of a button of the e-book reader of FIG. 1, in an unactivated configuration.

FIG. 3 illustrates a cross section 300 through the line 114 shown in FIG. 1. As shown in FIG. 3, the button 102 is disposed on the edge of e-book reader 100 and is positioned in an unactivated configuration. When a user exerts no pressure on button 102, spring 204 returns button 102 to the unactivated configuration 302 shown in FIG. 3. In the unactivated configuration 302, button 102 is substantially coplanar with the front surface 104. The axis of rotation 106 may be placed between about zero and about nine-tenths the distance from the edge of the device 110 to the innermost edge 108 of the button 102. For example, the hinge could be placed at about one-half or about one-third the distance from the edge of the device 110 to the innermost edge 108 of the button 102.

A gap 304 between the edge of button 102 and the bottom cover 212 is smaller than the gap 210 defined when the button 102 is activated. The outside vertical edge 214 of button 102 may come into contact with bottom cover 212, thus acting as a stop and preventing button 102 from rotating towards the outside edge 110. Placement of the axis of rotation 106 for button 102 in proximity to the edge 110 of the device, maintains the desired reveal between button 102 and bottom cover 212.

Thus, location of the axis of rotation 106 proximate to the edge of the device 110 reduces inadvertent activation should the user depress the button 102 along distance d1. Additionally, the presence of the hinge in the axis of rotation 106 adds mechanical stability to the button 102, maintaining the desired reveal along the interface of button 102 and bottom cover 212.

The button, spring, and other components may be made by stamping, milling, molding, forming, or other methods of fabrication suitable to the material chosen, such as metals, plastics, or ceramics.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. Moreover, any of the features of any of the devices described herein may be implemented in a variety of materials or similar configurations.

What is claimed is:

1. An electronic book reader device configured to reduce inadvertent activation of a button, the electronic book reader device comprising:
   a button adjacent to an edge of the electronic book reader device and configured to produce a signal upon activation;
   an axis of rotation for the button proximate to, and substantially parallel with, the edge of the device;
   an inner portion of the button extending from an innermost edge of the button to the axis of rotation;
   an outer portion of the button extending substantially from the axis of rotation to an outermost edge of the button; and
   wherein activation of the button comprises moving the innermost edge of the button in an arc having a greater length of travel than the outermost edge of the button.

2. The electronic book reader device of claim 1, wherein the axis of rotation comprises a shaft.

3. The electronic book reader device of claim 1, wherein the axis of rotation comprises a living hinge.

4. The electronic book reader device of claim 1, wherein the axis of rotation comprises a resilient material.

5. The electronic book reader device of claim 1, wherein the axis of rotation is located less than one half a distance from the outermost edge of the button to the innermost edge of the button.

6. The electronic book reader device of claim 1, wherein a spring maintains the button in an unactivated configuration.

7. A device comprising:
   a button adjacent to an edge of the device and configured to produce a signal upon activation, wherein the button has an axis of rotation proximate to the edge of the device;
   an innermost edge of the button distal to the edge of the device; and
   an outermost edge of the button proximate to the edge of the device,
   wherein the button is activatable by moving the innermost edge of the button in an arc having a greater length of travel than the outermost edge of the button.

8. The device of claim 7, wherein the button is rotatable about the axis of rotation.

9. The device of claim 8, wherein the axis of rotation comprises a shaft.

10. The device of claim 8, wherein the axis of rotation comprises a living hinge.

11. The device of claim 8, wherein the axis of rotation comprises a resilient material.

12. The device of claim 11, wherein the resilient material comprises:
a first resilient member proximate to the outermost edge of the button and engaging the button and the device;
a second resilient member proximate to the innermost edge of the button and engaging the button and the device; and
wherein the first resilient member has a greater modulus of elasticity than the second resilient member.

13. The device of claim 7, wherein the axis of rotation is located less than one half a distance from the edge of the device to the innermost edge of the button.

14. The device of claim 7, wherein a spring maintains the button in an unactivated configuration until application of a pressure generally normal to a button.

15. An electronic device comprising:
an edge of the electronic device;
a user input surface adjacent to the edge of the device, the user input surface having an axis of rotation parallel and adjacent to the edge of the device, the axis located nearer the edge of the electronic device than an innermost edge of the user input surface; and
a switch activatable by pressure on the user input surface and configured to send a signal.

16. The electronic device of claim 15, wherein the axis of rotation comprises a shaft with endpoints affixed to the electronic device.

17. The electronic device of claim 15, wherein the axis of rotation comprises a resilient material coupled between the user input surface and the electronic device.

18. The electronic device of claim 15, wherein the axis of rotation comprises a living hinge.

19. The electronic device of claim 18, wherein the user input surface comprises a front surface of the electronic device.

20. The electronic device of claim 15, wherein the axis of rotation is located less than one-third a distance from the edge of the device to the innermost edge of the user input surface.

* * * * *

UNITED STATES PATENT AND TRADEMARK OFFICE
CERTIFICATE OF CORRECTION

| | |
|---|---|
| PATENT NO. | : 8,432,356 B2 |
| APPLICATION NO. | : 12/351717 |
| DATED | : April 30, 2013 |
| INVENTOR(S) | : Steven Chase |

It is certified that error appears in the above-identified patent and that said Letters Patent is hereby corrected as shown below:

The title page should be deleted to appear as per attached title page.

The sheets of drawings consisting of figures 1-3 should be deleted and replaced with the attached figures 1-3.

Signed and Sealed this
Twenty-seventh Day of August, 2013

Teresa Stanek Rea
*Acting Director of the United States Patent and Trademark Office*

(12) United States Patent
Chase (10) Patent No.: US 8,432,356 B2
(45) Date of Patent: Apr. 30, 2013

(54) BUTTON WITH EDGE MOUNTED PIVOT POINT

(75) Inventor: Steven Chase, Cupertino, CA (US)

(73) Assignee: Amazon Technologies, Inc., Reno, NV (US)

(*) Notice: Subject to any disclaimer, the term of this patent is extended or adjusted under 35 U.S.C. 154(b) by 1003 days.

(21) Appl. No.: 12/351,717

(22) Filed: Jan. 9, 2009

(65) Prior Publication Data
US 2010/0177033 A1 Jul. 15, 2010

(51) Int. Cl.
*G09G 5/00* (2006.01)

(52) U.S. Cl.
USPC ........... 345/156; 345/161; 345/164; 345/167; 345/169

(58) Field of Classification Search ............ None
See application file for complete search history.

(56) References Cited

U.S. PATENT DOCUMENTS

| | | | |
|---|---|---|---|
| 5,534,888 A * | 7/1996 | Lebby et al. | 345/672 |
| 5,847,698 A | 12/1998 | Reavey et al. | |
| 6,344,618 B1 * | 2/2002 | Sato | 200/6 A |
| 6,441,753 B1 * | 8/2002 | Montgomery | 341/34 |
| 6,677,843 B1 | 1/2004 | Monroe et al. | |
| 7,499,025 B2 * | 3/2009 | Endo et al. | 345/157 |
| 7,705,799 B2 * | 4/2010 | Niwa | 345/1.1 |
| 7,748,634 B1 * | 7/2010 | Zehr et al. | 235/492 |
| 7,772,507 B2 * | 8/2010 | Orr et al. | 200/5 R |
| 8,018,431 B1 * | 9/2011 | Zehr et al. | 345/156 |
| 2005/0099391 A1 * | 5/2005 | Nishino et al. | 345/161 |
| 2005/0264540 A1 * | 12/2005 | Niwa | 345/173 |
| 2006/0250377 A1 * | 11/2006 | Zadesky et al. | 345/173 |
| 2009/0058802 A1 * | 3/2009 | Orsley | 345/157 |
| 2009/0102785 A1 * | 4/2009 | Sun et al. | 345/156 |

FOREIGN PATENT DOCUMENTS

CN 1365240 8/2002

OTHER PUBLICATIONS

PCT Search Report for PCT Application No. PCT/US10/20367, mailed May 26, 2010, 10 pages.
Chinese Office Action mailed Jan. 14, 2013 for Chinese patent application No. 201080004325.7, a counterpart foreign application of U.S. Appl. No. 201080004325.7, 20 pages.

* cited by examiner

*Primary Examiner* — Dismery Mercedes
(74) *Attorney, Agent, or Firm* — Lee & Hayes, PLLC (57) ABSTRACT

A device disclosed herein reduces inadvertent activation of buttons mounted on edges of an electronic device. The button moves around an axis of rotation proximate to, and parallel with, the adjacent edge of the device. Thus, inadvertent pressure on an edge of the button adjacent to the edge of the device will not inadvertently activate the button. Additionally, the presence of the axis of rotation proximate to the edge maintains a desired reveal.

20 Claims, 3 Drawing Sheets

FIG. 2

FIG. 3